Patented Oct. 10, 1939

2,176,030

UNITED STATES PATENT OFFICE 2,176,030

STABILIZATION OF FOODS

Sidney Musher, New York, N. Y., assignor to Musher Foundation Incorporated, New York, N. Y., a corporation of New York No Drawing. Application June 30, 1939, Serial No. 282,080

10 Claims. (Cl. 99—163)

This invention relates to retarding decomposition of glyceride oils and food compositions containing the same.

The oil bearing seeds have been found to possess some antioxidant effect when added to an oil and subsequently filtered from that oil as more particularly shows in copending Patents 2,069,265, 2,093,971, and 2,097,252 of which this application is a continuation in part through application, Serial No. 123,315 filed January 30, 1937.

When an oil containing seed, such as sesame seed, is added to an oil and with the solid materials subsequently filtered therefrom, the resultant oil is improved in keeping quality, but, on subjecting that treated oil to an elevated temperature such as to deodorization temperatures of about 400° F., part or all of the antioxidant effect originally transferred to the oil is lost. In addition, it is frequently not readily possible to remove a seed from an oil.

An object of this invention is therefore to retard deterioration of the glyceride oils by the use of seed materials in such way that the antioxidant effect is not inactivated by subjecting the oil to elevated temperatures and so that there will be no difficulty experienced in removing the solid seed residue from the oils being stabilized.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, there is used an alcohol soluble extract of the oil containing seeds. The alcohol that is employed is preferably a low molecular weight aliphatic alcohol such as ethyl, methyl, butyl or propyl. Other mono-hydric alcohols and alcohol soluble solvents which may be used are isopropyl and butyl. The polyhydric alcohols, including glycerol, the glycols, polyglycols, glycerol ethers, glycol ethers, etc., may also less preferably be employed.

The alcoholic extract of an oil containing seed, nut or fruit is prepared, preferably after the oil contained in the seed has been expressed or has been extracted, as by the use of hexane or similar fat solvent. Following the expression or extraction of the oil, the seed, nut or fruit deoiled residue which remains is substantially freed of the crude oils contained therein, and which crude oils also contain lecithin. The seed, nut or fruit should be expressed or extracted so that its oil content remaining is approximately 10% or less and the residue may then be finely divided, preferably to flour form so that the alcohol or similar solvent will more readily extract the desired materials therefrom. The residue may be subjected to a milling or other means to finely divide prior to extraction with alcohol.

The oil-bearing seeds, nuts and fruits are generically referred to herein under the term "seed" or "glyceride seed" and this will include such products as sesame, sunflower, peanut, cottonseed, walnut, castor bean, soya bean, watermelon seed, tomato seed, palm, palm kernel, linseed, olives, etc. There are also included the oil-bearing germs such as corn germ, wheat germ, rice germ, etc.

These seeds are utilized preferably in their de-oiled form, for example, as press cakes or solvent extracted press cakes.

Among the oils that may be stabilized in accordance with this invention are particularly any of the edible glyceride oils such as refined cottonseed oil, soya bean oil, peanut oil, seasame oil, cocoanut oil, palm kernel oil, palm oil and also including any of the fully refined and deodorized or hydrogenated vegetable and animal fats and oils. There may also be treated the animal fats and oils such as lard, tallow, oleo oil, mutton fat, neat's-foot oil, the fish and fish liver oils such as cod liver oil, herring oil, salmon oil, mackerel oil, halibut liver oil, etc.

The oils that are treated are desirably in edible condition, but they may also be in crude or refined form or for use for industrial purposes such as for sulfonation, in the textile industry, for soap making, etc.

An alcoholic extract of the finely divided seeds, preferably in deoiled form, is prepared and thoroughly admixed in and through the glyceride oil to be treated.

For example, an ethyl alcoholic extract of finely divided soya bean press cake is prepared by mixing 1 part of soya bean press cake flour with 5 to 10 parts by weight of ethyl acohol, mixing thoroughly at a temperature of about 100° F., removing the undissolved soya bean flour residue, and then evaporating off the alcohol soluble portion, preferably under reduced pressure in order to leave the alcohol soluble portion in substantially concentrated form.

The alcoholic extract thus obtained differs in a number of ways from the crude glyceride oils, such as crude soya bean oil, or from lecithin itself. First of all, the alcoholic extract is high in carohydrate material such as in sugars and the sugars appear to play a very important part in the antioxidant effect of this alcoholic extract.

Because of the presence of these sugars, the alcoholic extract is not completely soluble in the glyceride oils that are to be treated and the extract should be added to and thoroughly mixed in the glyceride oil in order to exhibit its full antioxidant action.

Moreover, the alcoholic extract very surprisingly becomes materially increased in effectiveness when subjected to an elevated temperature after addition to the glyceride oil to which it has been added for the purpose of retarding rancidity, whereas it is normally recognized that antioxidants of the nature of lecithin and crude glyceride oils become inactivated or substantially less effective when subjected to elevated temperatures.

For example, the ethyl alcoholic extract of soya bean press cake flour may be added to lard, thoroughly admixed in the lard, and the lard then heated to 400° F. for 5 minutes, at the end of which heating period the stability of the lard is from 5 to 10 times greater than where the alcoholic extract has been added to the lard and the lard not heated to the temperature of 400° F.

The following tests were conducted on the so called "Swift stability apparatus" by means of which 20 cc. of oil is tested with air being bubbled through the sample at 208° F. until rancidity is observed both organoleptically and by peroxide value, the number of hours indicating the stability of the lard before rancidity occurred.

| Control lard | Rancid after— |
|---|---|
| Lard containing 0.1% ethyl alcoholic extract of hexane extracted soya bean flour (after the soya bean flour had been subjected to a hexane extraction). | 2 hours. 5 hours. |
| Lard containing 0.1% alcoholic extract of hexane extracted soya bean flour which was heated in the lard to 400° F. for 5 minutes and then tested. | 18 hours. |
| Control refined deodorized cottonseed oil | 12 hours. |
| Cottonseed oil containing 0.5% methyl alcoholic extract expressed peanut flour press cake. | 21 hours. |
| Cottonseed oil containing 0.5% methyl alcoholic extract of expressed peanut flour press cake which had been heated in the cottonseed oil to 400° F. for 5 minutes. | 32 hours. |

Similar tests conducted under room temperature conditions show the definite improvement in keeping quality following the addition of the alcohol soluble extract of the finely divided seeds to a glyceride oil subject to oxidative deterioration, although when the oil is then subjected to an elevated temperature such as to in excess of 200° F. and desirably to a temperature of around 400° F., the increase in stability is very materially greater.

The alcoholic extract that is obtained in accordance with this invention may be difficult to thoroughly admix throughout the body of the glyceride oil that is treated. In order for a more thorough mixture to be obtained, the glyceride oil containing the alcoholic extract may be subjected to a colloid mill treatment or to a grinding operation in order to break up the individual particles of the oil insoluble carbohydrate materials contained in the extract and to disperse them thoroughly throughout the body of the oil.

Where the oil is subjected to an elevated temperature such as to 400° F. with the alcoholic extract, the carbohydrate material will char and blacken in the oil, but even in spite of this charring, the very marked increase in stability is obtained.

The alcoholic extract is desirably used in an amount of less than 5% and preferably in an amount of 1% or less. As little as 0.05% will show a definite improvement in keeping quality and the amount that is used will depend upon the degree of protection that is desired and the normal stability of the oil that is treated.

Where desired, the alcoholic extract may be prepared with and/or dried upon a carrier such as salt, sugar, powdered skim milk, cereal flours, starch, seed flours, or other material. A mixture may be prepared comprising, for example, from 10% to 60% by weight of the alcoholic extract in the carrier in order to obtain a dry powdered material which may readily be used for addition to food compositions subject to oxidation to retard oxidative deterioration thereof.

A desirable carrier is, for example, sugar and a mixture may be prepared comprising 1% of the ethyl alcoholic extract of deoiled soya bean flour and 99% of cane sugar, or using as large a proportion as 60% of the ethyl alcoholic extract and 40% of cane sugar. The finished sugar carrying the alcoholic extract is in powdered form and may be readily applied to and dispersed throughout the body of an organic composition subject to oxidation more readily than the alcoholic extract itself in view of the difficulty with which the alcoholic extract is dispersed or is broken up into fine pieces.

It is particularly desirable for the alcoholic extract to be added to glyceride oils that are subsequently subjected to elevated temperatures such as where the extract is added to oils used for the subsequent frying of potato chips, nuts, doughnuts, or in baking, or where the oils are subsequently subjected to a deodorizing operation at a temperature of about 400° F. During normal frying operations, the oil reaches a temperature of between 275° F. and 350° F. and where the alcoholic extract is first added to the oil and then that oil used for the frying of potato chips or nuts, for example, not only will the oil itself be very materially improved in keeping quality, but the potato chips or nuts fried or roasted in that oil will also be improved in keeping quality.

The following is an example of the degree of protection afforded to potato chips by frying the potato chips in refined deodorized corn oil at a temperature of 325° F. before the potato chips were placed into the kettle. The potato chips were held at 125° F. and observations were made at regular intervals. In one series the potato chips were fried in the control refined deodorized corn oil and in another series the potato chips were fried in a similar lot of corn oil to which 0.2% of the ethyl alcoholic extract of soya bean press cake flour had been added.

Observations after—

Potato chips in untreated oil__ "Off" after 7 days, rancid after 9 days

Potato chips in treated oil____ "Off" after 13 days, rancid after 17 days

Moreover, the alcoholic extract may be added to oils prior to the deodorization treatment or at the close of deodorization and while the oil is still at an elevated temperature so that when the oil is finally cooled down and ready for packaging and distribution, the alcoholic extract distributed therein will have exerted its antioxidant action particularly as a result of the high temperature treatment.

Where a glyceride oil is subjected to an elevated temperature such as to 400° F. after addition of the alcoholic extract thereto, and where the alcoholic extract has become charred or burnt in the oil, the oil may be subjected to a filtration operation in order to remove the undissolved charred or residual material. This filtration is not desirable unless the oil has been heated to an elevated temperature as otherwise the alcoholic extract should be dispersed throughout the body of the glyceride oil.

It is particularly unusual that even hexane or gasoline extracted seed residues will produce on alcoholic extraction, an antioxygenic material that is substantially effective for retarding the development of rancidity in the oils. Heretofore it was normally expected that when a seed is subjected to hexane or gasoline extraction all of the antioxidants are removed along with the removal of the glyceride oil contained therein.

The alcoholic extract is also desirable for addition to rendering kettles at the time that the oils are removed from animal flesh materials. For example, from 0.05% to 3% against the weight of the fat contained in the animal flesh material may be added to chopped hog fat or fish meal or similar material which is then placed in the rendering kettle and subjected to an elevated temperature such as to from 200° F. to 350° F. and at the close of the rendering operation that lard, fish oil, cod liver oil, or other oil produced from that rendering operation is very materially stabilized against oxidative deterioration.

The alcoholic extract of the seeds, and particularly of the deoiled seeds, may also desirably be added to fat and oil containing compositions and particularly to fat and oil containing food compositions. For example, from 0.01% to 2% of the alcohol soluble extract may be added to milk, cream that is used in the manufacture of butter or in the manufacture of cream cheese, ice cream, cream for freezing and storage, whipping cream, etc., in order to stabilize them against the development of oxidized, tallowy and metallic flavors. The extract may also be used for addition with or absorbed upon salt, sodium nitrate, sodium nitrite, etc., in the curing of bacon, hams, fishery products, etc.

The extract may also be used for addition to orange juice, orange juice concentrates, citrus fruit juices, and other food compositions that are subject to oxidative deterioration including such other materials as egg albumen, etc. Other food materials that may also be protected in a similar manner are the essential oils such as oil of orange, oil of lemon, etc., candies, and also mineral oil and mineral oil emulsions.

It is particularly desirable for these food compositions that are subject to oxidation to use the alcoholic extract along with a carrier, absorbent or enhancing agent such as powdered skim milk, salt, sugar, starch, cereal flours, such as oat, wheat, maize, barley, tapioca, buckwheat, or a seed flour, preferably of a deoiled seed, such as soya, sesame, peanut, sunflower, cottonseed, etc. In this way the carrier containing the alcoholic extract is more readily dispersable in the food composition subject to oxidation in order to retard oxidative deterioration thereof.

As a general rule, these alcohol soluble extracts may be combined with or absorbed upon the various carriers by mixing alcohol or aqueous solutions of the carriers with alcohol and/or aqueous solutions of the alcoholic extracts and the combined mixture may be evaporated to dryness. The evaporation may take place under reduced pressure or by drum drying, or the alcohol soluble extracts containing from 5% to 50% or more of the alcohol or of other similar liquid solvent may be sprayed upon or mixed with the dried sugar, salt, powdered skim milk, starch, cereal flour, seed flour, etc., and then this mixture may be dried if not already in substantially dry condition. This mixture may be prepared so that the alcohol soluble extracts are not observable and the mixture may look like the ordinary sugar, salt, powdered skim milk, starch, cereal flour, seed flour, etc. On the other hand, sufficient of the extract may be incorporated with the carrier so that a distinctly new appearance is given to the carrier containing the antioxidant.

These combinations of carrier and the alcohol soluble extract may also be utilized in the form of pastes, creams, or even syrups.

In the case of those food compositions that are subjected to an elevated temperature as in the cooking of candies or in subjecting cream to a heat treatment of 180° F. before manufacture into butter, it is desirable for the addition of the alcoholic extract to be made prior to subjecting the food composition to the elevated temperature.

Where desired, the seed prior to extraction with the alcohol or alcohol soluble solvent may be acidified as by boiling with from 0.5% to 5% of an aqueous solution of acetic acid or some similar acid as disclosed in copending application, Serial No. 135,169 filed April 5, 1937. Following the acidifying treatment, the seed may then be neutralized, dried, and subjected to the alcoholic extraction and it is observed that the alcoholic extract thus obtained is a more effective antioxidant than where the alcoholic extract is obtained from the seed which has not been subjected to the acidifying treatment.

In addition to the use of the alcoholic type of solvent for extracting the seeds, there may also less preferably be employed water or water-alcohol mixtures as the solvent and preferably in slight acid condition, such a solvent having a pH of between 5 and 6.9. These solvents may all come under the classification of the alcohol soluble solvents.

The alcoholic extracts appear to contain water soluble as well as alcohol soluble carbohydrates and organic nitrogen and prosphorous compounds which appear to be substantially unchanged in the final extract as compared with their chemical condition when present in and when extracted from the seed. There may be slight changes as, for example, slight charring or polymerization or caramelization which do not appear to detract from the antioxygenic properties of the alcohol soluble extract.

It is, of course, possible to subject the alcohol soluble extract to more drastic drying and other procedures when the extracts are absorbed upon the carriers such as salt, sugar, powdered skim milk, etc. When absorbed upon such a carrier the material appears to increase in activity and to retain all of its desirable antioxygenic properties for much longer periods and also appears to become more active in certain types of compositions that the extract serves to protect.

Moreover, the alcohol soluble extracts appear to form some very intimate physical absorption products or even chemical combinations with the powdered carriers.

The alcohol soluble extract when slightly concentrated will vary in color from very light to dark brown or black and may have the appearance and consistency of thick sugar syrup.

There will be contained in the alcoholic extract the carbohydrates in relatively solid form which carbohydrates are frequently difficult to break up into fine pieces but which fine state of division must necessarily be given to the carbohydrate material in order to obtain thorough dispersal throughout the body of the organic composition to be protected against oxidative deterioration.

Having described my invention what I claim is:

1. A substantially stabilized glyceride oil containing a small amount, less than 5%, of an alcohol soluble extract of an antioxygenic de-oiled seed.

2. A food composition normally subject to oxidative deterioration, substantially stabilized against such deterioration, containing a small amount, less than 5% of an alcohol soluble extract of finely divided antioxygenic de-oiled seed material.

3. A glyceride oil containing food composition, normally subject to oxidative deterioration, substantially stabilized against such deterioration carrying a small amount, less than 2%, of an alcohol soluble extract of a finely divided de-oiled seed.

4. A method of retarding oxidative deterioration in glyceride oil containing compositions which comprises adding thereto and thoroughly dispersing therein a small amount, less than 5%, of an alcohol soluble extract of a de-oiled seed flour.

5. A food composition normally subject to oxidative deterioration, substantially stabilized against such deterioration, containing a small amount, less than 5%, of an alcohol soluble extract of antioxygenic de-oiled peanut press cake.

6. A food composition normally subject to oxidative deterioration, substantially stabilized against such deterioration, containing a small amount, less than 5%, of an alcohol soluble extract of antioxygenic de-oiled soya flour.

7. A food composition normally subject to oxidative deterioration, substantially stabilized against such deterioration, containing a small amount, less than 5%, of an ethyl alcohol soluble extract of finely divided antioxygenic de-oiled seed material.

8. A food composition normally subject to oxidative deterioration, substantially stabilized against such deterioration, containing a small amount, less than 5%, of an alcohol soluble extract of antioxygenic de-oiled seed flour, dried upon a carrier.

9. A food composition normally subject to oxidative deterioration, substantially stabilized against such deterioration, containing a small amount, less than 5%, of an acidified alcohol soluble extract of finely divided antioxygenic de-oiled seed material.

10. A food composition normally subject to oxidative deterioration, substantially stabilized against such deterioration, containing a small amount, less than 5%, of an acidified water-alcohol mixture soluble extract of finely divided antioxygenic de-oiled seed material.

SIDNEY MUSHER.